United States Patent Office 3,681,079
Patented Aug. 1, 1972

3,681,079
PHOTOSENSITIVE EMULSION COMPRISING GRAFT COPOLYMER OF AMINO ALKYL ACRYLATE
Maurice J. Fitzgerald, Canton, Mass., assignor to Polaroid Corporation, Cambridge, Mass.
No Drawing. Filed Jan. 22, 1971, Ser. No. 108,955
Int. Cl. G03c 1/04
U.S. Cl. 96—114      18 Claims

ABSTRACT OF THE DISCLOSURE

A photosensitive silver halide emulsion wherein the emulsion binder comprises a graft copolymer of an amine acrylate monomer on a polymer containing a plurality of hydroxyl groups.

BACKGROUND OF THE INVENTION

This invention relates to photography and more particularly, to novel photosensitive photographic elements, particularly novel photosensitive emulsions.

As a result of the known disadvantages of gelatin, in particular, its variable photographic properties and its fixed physical properties, for example, its diffusion characteristics; much effort has been expended in the past in order to replace gelatin with a suitable synthetic colloid binder for photographic silver halide emulsions. Many synthetic polymeric materials have heretofore been suggested as peptizers for silver halide emulsions, however, these have generally not functioned satisfactorily and frequently have not fulfilled all of the basic requirements for a photosensitive silver halide emulsion binder listed following:

(1) absent (or constant) photographic activity;
(2) ability to form an adsorption layer on microcrystals of silver halide permitting stable suspensions to be obtained;
(3) ability to form adsorption layers as described in (2) above which do not prevent growth of silver halide microcrystals during physical ripening; and
(4) solubility in water solution.

In addition, hithertofore, much emphasis has been placed on the ability of the synthetic polymeric material to mix with gelatin, as this property has been critical for employment in partial substitution reactions with gelatin. Consequently, many synthetic polymers of the prior art have been materials which allow for the growth of silver halide crystals only in the presence of gelatin.

A class of synthetic polymers has now been found which is not susceptible to the deficiencies of the prior art and which may replace gelatin entirely in photosensitive silver halide emulsions.

BRIEF DESCRIPTION OF THE INVENTION

The present invention is directed to a photosensitive silver halide emulsion wherein the silver halide crystals are disposed in a synthetic polymeric binder comprising a graft copolymer of an amine acrylate monomer of the formula:

$$H\overset{R_1}{\underset{|}{C}}=\overset{R_2}{\underset{|}{C}}-\overset{O}{\underset{\|}{C}}-O-R_3-N\overset{R_4}{\underset{R_5}{\diagdown}}$$

wherein $R_1$ is hydrogen, lower alkyl, e.g., 1–4 carbon alkyl, preferably methyl or ethyl, or halogen; $R_2$ is hydrogen, lower alkyl, preferably 1–4 carbon alkyl group, halogen or cyano; $R_3$ is lower alkylene or lower cycloalkylene; $R_4$ and $R_5$ are each hydrogen, lower alkyl or lower cycloalkyl; and $R_3$ and/or $R_4$ and/or $R_5$ may comprise a ring structure; on a polymer containing a plurality of hydroxyl groups. In an alternative embodiment, the graft copolymer also includes a second monomer grafted thereon, i.e., an ethylenically unsaturated monomer. In still another embodiment, the above-described synthetic graft copolymer comprises only a portion of the binder, the remainder constituting gelatin or a second synthetic polymer.

DETAILED DESCRIPTION OF THE INVENTION

The present invention is directed to photosensitive silver halide emulsions wherein photosensitive silver halide crystals are disposed in a synthetic polymeric binder comprising a polymer containing a plurality of hydroxyl groups having grafted thereon an amine-acrylate monomer of the formula:

$$H\overset{R_1}{\underset{|}{C}}=\overset{R_2}{\underset{|}{C}}-\overset{O}{\underset{\|}{C}}-O-R_3-N\overset{R_4}{\underset{R_5}{\diagdown}}$$

wherein $R_1$ is hydrogen, lower alkyl, e.g., 1–4 carbon alkyl, preferably methyl or ethyl, or halogen; $R_2$ is hydrogen, lower alkyl, preferably 1–4 carbon alkyl group, halogen or cyano; $R_3$ is lower alkylene or lower cycloalkylene; $R_4$ and $R_5$ are each hydrogen, lower alkyl or lower cycloalkyl; and $R_3$ and/or $R_4$ and/or $R_5$ may comprise a ring structure.

Such polymers have been found to substantially provide all of the basic requirements for a gelatin substitute, as delineated above. The emulsions of the present invention are readily sensitized by conventional sensitizing agents and are characterized by excellent latent image stability and excellent film speed. In addition, the emulsions of the present invention are much more stable against degradation, particularly hydrolysis and the growth of microorganisms than gelatin.

With regard to the backbone polymer of the graft copolymer, in general, any organic polymer comprising repeating units comprising structural units containing a plurality of $$-\underset{\underset{OH}{|}}{\overset{|}{C}}-$$

groupings capable of being oxidized by, e.g., a transition metal ion catalyst is useful in the present invention. Preferred backbones are substituted or unsubstituted cellulosic or polyvinyl polymers, and most preferably, a backbone selected from the group consisting of polymeric polyols, polyvinyl alcohol, gelatin, polysaccharides, partial acetals of polyvinyl alcohol, etc.

It is believed that upon oxidation of the $$-\underset{\underset{OH}{|}}{\overset{|}{C}}-$$

grouping, the free radical is formed, which attacks the double bond of the amine acrylate monomer, thus initiating polymerization.

As examples of polymers containing a plurality of hydroxyl groups, mention may be made of the following:

(1) cellulose (2) carboxymethyl cellulose

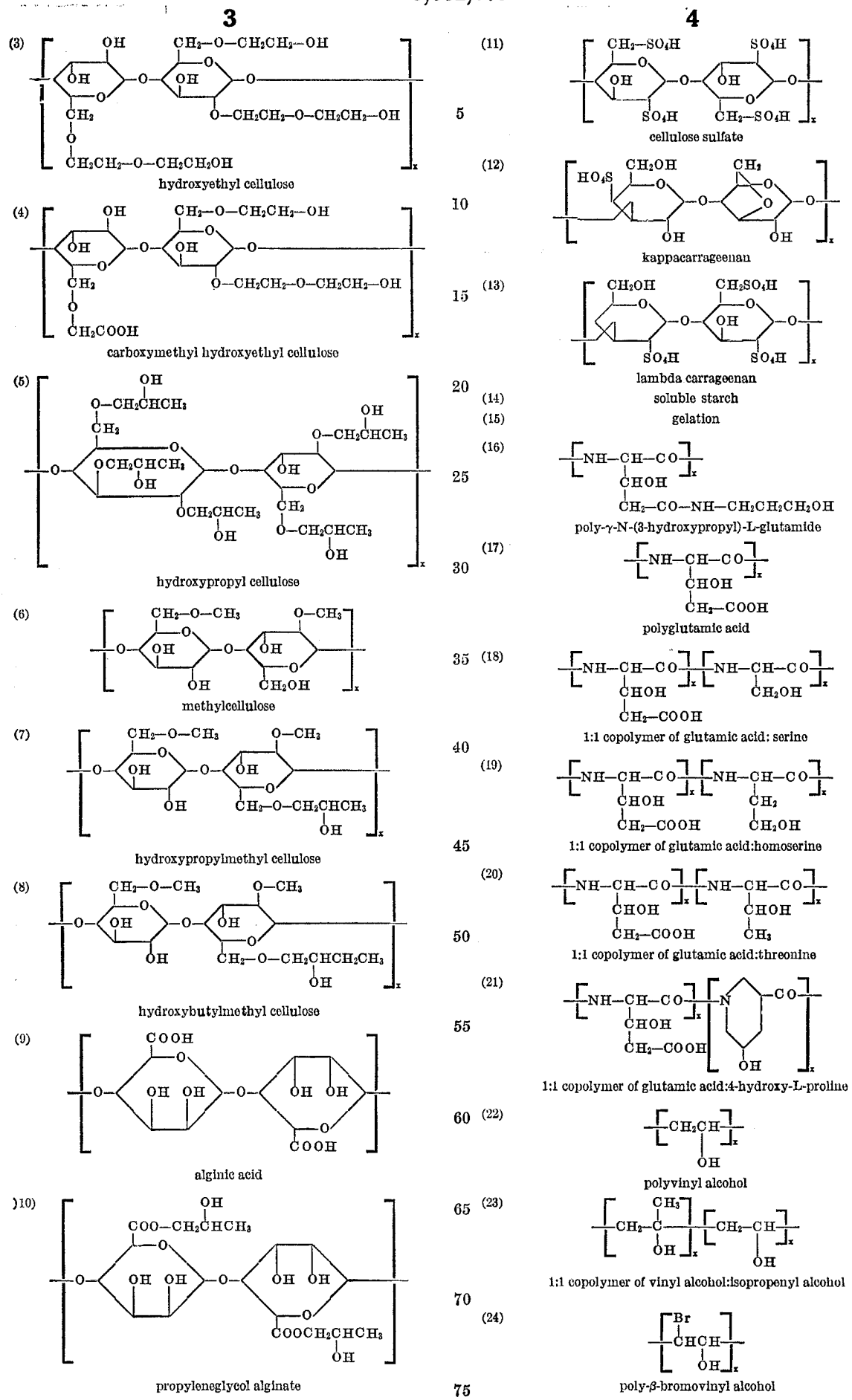

(25) poly-β-chlorovinyl alcohol

(26) polypropene-1-ol

(27) polyhydroxymethyl methacrylate

(28) poly-β-hydroxyethyl acrylate

(29) poly-γ-hydroxypropyl-α-chlorocrotonate

(30) 1:1 copolymer of acrylamide:2-hydroxy-n-propyl-α,β-dibromoacrylate

(31) poly-N-methylol acrylamide

(32) poly-N-methyl-N-β-hydroxyethyl methacrylamide

(33) poly-N[γ-hydroxy-n-propyl-α]-chloroacrylamide

(34) 1:1 copolymer of acrylamide:N[β-hydroxy-n-propyl]α-bromoacrylamide

(35) 1:1 copolymer of acrylamide:N-ethyl-N-(β-hydroxyethyl)crotonamide

(36) polyvinyl hydroxymethyl ether

(37) polyisopropenyl β-hydroxyethyl ether

(38) poly-α-chlorovinyl γ-hydroxypropyl ether

(39) poly-α-bromovinyl β-hydroxy-n-propyl ether

(40) polyvinyl hydroxymethyl ketone

(41) 1:1 copolymer of acrylamide:isopropenyl β-hydroxyethyl ketone

(42) 1:1 copolymer of acrylamide:α-chlorovinyl γ-hydroxypropyl ketone

(43) 1:1 copolymer of acrylamide:α-bromovinyl β-hydroxy-n-propyl ketone

(44) poly-N-vinylpyrrolidone

Typical examples of monomers useful for employment in the instant invention for grafting onto the polymer containing the plurality of carboxyl group include:

(45) 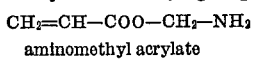
aminomethyl acrylate

(46) 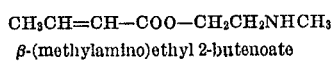
β-(methylamino)ethyl 2-butenoate

(47) CH₃CH₂CH=CH—COO—CHCH₃
         |
         N—(CH₃)₂

α-(dimethylamino)ethyl 2-pentenoate

(48) CH₂=CH—COO—CH₂CH₂—N—(CH₃)₂

β-(dimethylamino)ethyl acrylate

(49) Cl—CH=CH—COO—CH₂CH₂CH₂NH—CH₂CH₃

3-(ethylamino)-n-propyl-β-chloroacrylate

(50) Br—CH=CH—COO—CHCH₃—N—CH₂CH₃
                      |        |
                      CH₃      CH₃

1-(methylethylamino)-prop-2-yl-β-bromoacrylate

(51)       CH₃
            |
     CH₂=C—COO—CH₂CH₂—N—(CH₃)₂

β-(dimethylamino)ethyl methacrylate

(52) CH₂=CH—COO—CH₂CH₂—N—(CH₂CH₃)₂

β-(diethylamino)ethyl acrylate

(53)       C≡N
            |
     CH₂=C—COO—CH₂CH₂—N—(CH₃)₂

2'-(dimethylamino)ethyl α-cyanoacrylate

(54)       CH₃
            |
     CH₂=C—COO—CH₂CH₂—N—(CH₂CH₃)₂

β-(diethylamino)ethyl methacrylate

(55)   Cl      CH₃
        |       |
  CH₂=C—COO—C—NH—CH₂CH₂CH₃
                |
                CH₃

2-(n-propylamino)-prop-2-yl-α-chloroacrylate

(56)   Br
        |
  CH₂=C—COO—CH₂CH₂CH₂CH₂—N⟨⟩

N-[4-(α-bromoacryloyloxy)but-1-yl]pyrrolidine

(57)       CH₃
            |
     CH₃=C—COO—CH₂CH₂—NH—C—(CH₃)₃

β-(tertiary butylamino)ethyl methacrylate

(58)   CH₂CH₃   CH₃
        |         |
  CH₂=C—COO—CHCH₂CH₂—N⟨⟩

N-[3-(ethacryloyloxy)but-1-yl]piperidine

(59)       Cl
            |
  CH₃CH=C—COO—CH₂CH₂—N⟨⟩

1-[β-(2'-chloro-2'-butenoyloxy)ethyl azatane

(60)       Cl
            |
  Cl—CH=C—COO—CH₂CH₂—N⟨⟩

1-[β-(2,3-dichloroacryloyloxy)ethyl]homopiperidine

(61)   CH₂=CH—COO—⟨⟩N—CH₃

4-acryloyloxy 1-methylpiperidine

(62)   CH₂=CH—COO—⟨⟩N 3-acryloyloxy-quinuclidine

(63)   CH₂=CH—COO—CH₂CH₂—N⟨⟩
                            |
                            CH₃

β-(n-methyl-N-cyclopentylamino)ethyl acrylate

(64)   CH₂=CH—COO
            |
           ⟨⟩
            |
            N—(CH₃)₂

1-acryloyloxy-3-dimethylamino cyclopentane

The instant graft polymers may have, in addition to the structure defined above, any compatible repeating unit or various units or additional grafted segments which are not detrimental to photographic silver halide emulsions. Examples of typical comonomers which may be employed include the following ethylenically-unsaturated monomers:

(65)   CH₂=CH—COOH
       acrylic acid

(66)       CH₃
            |
     CH₂=C—COOH
       methacrylic acid

(67)       Cl
            |
     CH₂=C—COOH
       α-chloroacrylic acid

(68)       Br
            |
     CH₂=C—COOH
       α-bromoacrylic acid

(69)   CH₃CH=CH—COOH
       crotonic acid

(70)   CH₃CH=CH—COOH
       isocrotonic acid

(71)   Cl—CH=CH—COOH
       β-chloroacrylic acid

(72)   Br—CH=CH—COOH
       β-bromoacrylic acid

(73)       CH₃
            |
     Cl—CH=C—COOH
       β-chloromethacrylic acid

(74)   CH₂=CH—COO—CH₃
       methyl acrylate

(75)       CH₃
            |
     CH₂=C—COO—CH₂CH₃
       ethyl methacrylate

(76)       Cl
            |
     CH₂=C—COO—CH₂CH₂CH₃
       n-propyl-α-chloroacrylate

(77)   Br—CH=CH—COO—CH—(CH₃)₂
       isopropyl-β-bromoacrylate

(78)       CH₃
            |
     CH₂=C—COO—CH₂CH—(CH₃)₂
       isobutyl methacrylate

(79)   CH₂=CH—COO—CH₂CH₂OH
       β-hydroxyethyl acrylate

(80)   CH₂=CH—COO—CH₂CH₂CH₂OH
       γ-hydroxypropyl acrylate

(81)       CH₃
            |
     CH₂=C—COO—CH₂CHCH₃
                    |
                    OH
       2-hydroxy-n-propyl methacrylate

(82)   CH₂=CH—CO—NH₂
       acrylamide

(83) $CH_2=C(Cl)-CO-NH_2$
α-chloroacrylamide

(84) $CH_2=C(Br)-CO-NH_2$
α-bromoacrylamide

(85) $CH_2=C(CH_3)-CO-NH_2$
methacrylamide

(86) $CH_2=C(CH_2CH_3)-CO-NH_2$
α-ethylacrylamide

(87) $Cl-CH=C(CH_3)-CO-NH$
β-chloromethacrylamide

(88) $Br-CH=C(Br)-CO-NH_2$
2,3-dibromoacrylamide

(89) $CH_3CH=CH-CO-NH_2$
crotonamide

(90) $CH_2=C(CH_3)-CO-NH-CH_3$
N-methylmethacrylamide

(91) $CH_2=CH-CO-N-(CH_3)_2$
N,N-dimethylacrylamide

(92) $CH_2=C(Cl)-CO-NH-CH_2CH_3$
N-ethyl-α-chloroacrylamide

(93) $CH_2=CH-CO-NH-C-(CH_3)_3$
N-tertiary butylacrylamide

(94) $CH_2=CH-CO-NH-C_6H_{11}$
N-cyclohexylacrylamide

(95) $CH_2=CH-CO-NH-C(CH_3)_2-CH_2-C(CH_3)_3$
N-tertiary octyl acrylamide

(96) $CH_2=CH-CO-NH-CH_2OH$
N-methylolacrylamide

(97) $CH_2=CH-CO-NH-CH_2CH_2OH$
N-(β-hydroxyethyl) acrylamide

(98) $CH_2=CH-CO-NH-C(CH_3)_2-CH_2-CO-CH_3$
diacetone acrylamide

(99) $CH_2=CH-CO-NH-CH-(CH_3)_2$
N-isopropylacrylamide (100) $CH_2=CH-CO-NH-CH_2-C_6H_5$
N-benzylacrylamide (101) $CH_2=CH-O-CH_3$
methylvinyl ether (102) $CH_2=C(Cl)-O-CH_2CH_3$
ethyl α-chlorovinyl ether (103) $CH_2=CH-O-CH_2CH_2Cl$
β-chloroethyl vinyl ether (104) $CH_2=CH-O-CH_2CH_2-OCH_3$
β-methoxyethyl vinyl ether (105) $CH_2=C(CH_3)-O-CH_2CH-(CH_3)_2$
isobutyl isopropenyl ether (106) $CH_2=CH-O-CH_2CH_2CH_2CH_2CH_2-CH-(CH_3)_2$
isooctyl vinyl ether (107) $CH_2=CH-CO-CH_3$
methylvinyl ketone (108) $CH_2=C(CH_3)-CO-CH_2CH_3$
ethyl isopropenyl ketone (109) $CH_2=C(Cl)-CO-CH_2CH_2CH_3$
n-propyl-α-chlorovinyl ketone (110) $CH_2=C(Br)-CO-CH_2CH_2-O-CH_3$
β-methoxyethyl-α-bromovinyl ketone (111) $CH_2=C(CH_2CH_3)-CO-CH_2CH_2OH$
β-hydroxyethyl-1-butene-2-yl ketone (112) $CH_2=CH-CHO$
acrolein (113) $CH_3-CH=CH-CHO$
crotonaldehyde (114) $CH_2=C(Cl)-CHO$
α-chloroacrolein (115) $CH_2=C(Br)-CHO$
α-bromoacrolein (116) $CH_2=CH-C\equiv N$
acrylonitrile (117) $CH_3CH=CH-C\equiv N$
crotononitrile (118) $CH_2=C(Cl)-C\equiv N$
α-chloroacrylonitrile (119) $CH_2=C(Br)-C\equiv N$
α-bromoacrylonitrile (120) $BrCH=C(CH_3)-C\equiv N$
β-bromomethacrylonitrile (121) $ClCH=C(CH_2CH_3)-C\equiv N$
β-chloroethacrylonitrile (122) $CH_2=C(C\equiv N)-COO-CH_3$
methyl α-cyanoacrylate (123) $CH_2=CH-CO-NH-CH_2-CO-NH_2$
acrylamidoacetamide (124) $CH_2=C(CH_3)-CO-NH-CH_2-CO-NH_2$
methacrylamidoacetamide (125) $CH_3CH=CH-CO-NH-CH(CH_3)-CO-NH-CH_3$
2-crotonamido-N-methylpropionamide (126) CH₂=CH—CO—NH—CH—CO—NH₂
           |
           CH₃
2-acrylamidopropionamide (127) CH₂=C—CO—NH—CH—CO—NH₂
         |         |
         CH₃       CH₃
2-methacrylamidopropionamide (128) CH₂=C—CO—NH—CH—CO—NH₂
         |       |
         Cl      CH
                 |
                 (CH₃)₂
2-(α-chloroacrylamido)-3-methylbutyramide (129) CH₂=CH—CO—NH—CH₂—NH—CO—CH₃
N-(acetamidomethyl)acrylamide (130) CH₂=C—CO—NH—CH₂—NH—CO—CH₂CH₃
         |
         CH₃
N-(propionamidomethyl)methacrylamide (131) Cl
      |
      CH₂=C—CO—NH—CH₂—NH—CO—CH₂CH₂CH₃
N-(n-butyramidomethyl) α-chloroacrylamide (132) 
maleic anhydride (133) HOOC—CH—CH—COOH
maleic acid (134) HOOC—CH=CH—CO—NH₂
maleic acid amide (135) HOOC—CH=CH—CO—NH—CH₂CH₃
N-ethylmaleic acid amide (136) CH₃—OOC—CH=CH—CO—NH—CH₃
N-methyl methylmaleate amide (137) CH₂=CH—OOCH
vinylformate (138) CH₂=CH—OOC—CH₃
vinyl acetate (139) CH₂=CH—OH
vinyl alcohol (140) CH₂=C—OOC—CH₂Br
         |
         CH₃
isopropenyl bromoacetate (141) CH₂=CH—OOC—O—(CH₃)₃
vinyl pivalate (142) CH₂=CH—NH—COO—C—(CH₃)₃
N-vinyl-tertiary butylcarbamate (143) CH₂=C—CH₂—COO—CH₂CH₃
         |
         COOH
ethyl-3-carboxy-3-butenate (144) 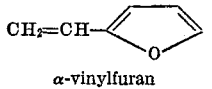
α-vinylfuran (145) 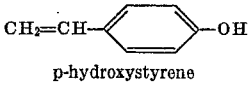
α-(acryloyloxymethyl)-tetrahydrofuran (146) 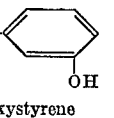
p-hydroxystyrene (147) 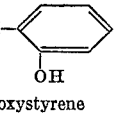
m-hydroxystyrene (148) 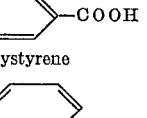
o-hydroxystyrene (149) 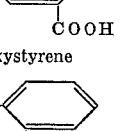
p-carboxystyrene (150) 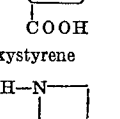
m-carboxystyrene (151) 
o-carboxystyrene (152) CH₂=CH—N
N-vinyl-2-pyrrolidone The following general procedure may be used for preparing photographic emulsions using the graft copolymers of the instant invention as the colloid binders.

A water-soluble silver salt, such as silver nitrate, may be reacted with at least one water-soluble halide, such as potassium, sodium, or ammonium bromide, preferably together with potassium, sodium or ammonium iodide, in an aqueous solution of the above-described graft copolymer. The emulsion of silver halide thus-formed contains water-soluble salts, as a by-product of the double decomposition reaction in addition to any unreacted excess of the initial salts. To remove these soluble materials, the emulsion may be centrifuged and washed with distilled water to a low conductance. The emulsion may be then be redispersed in distilled water. To an aliquot of this emulsion may be added a known quantity of a solution of bodying or thickening polymer, such as polyvinyl alcohol having an average molecular weight of about 100,000 (commercially available from E. I. du Pont de Nemours & Company, Wilmington, Del., designated Type 72–60). A surfactant, such as dioctyl ester of sodium sulfosuccinic acid, designated Aerosol OT, (commercially available from American Cyanamid Company, New York, N.Y.), may be added and the emulsion slot coated onto a base of cellulose triacetate sheet 5 mils thick having a coating of 30 mg./sq. ft. of hardened gelatin.

Alternatively, the soluble salts may be removed by adding to the emulsion a solution of polyacid such as 1:1 ethylene:maleic acid copolymer and lowering the pH to below 5, thereby bringing about precipitation of the polyacid carrying the silver halide grains along with the precipitate, and then to wash and resuspend the resulting precipitate by redissolving the polyacid at pH 6–7.

The emulsions may be chemically sensitized with sulfur compound such as sodium thiosulfae or thiourea, with reducing substances such as stannous chloride; with salts of noble metals such as gold, rhodium and platinum; with amines and polyamines; with quaternary ammonium compounds such as alkyl α-picolinium bromide; and with polyethylene glycols and derivatives thereof. The emulsions of the present invention require only 5% as much gold for chemical sensitization as do gelatin emulsions.

The graft copolymers employed in the emulsions of the present invention may be cross-linked according to conventional procedures. As an example, polymers containing amine groups may be cross-linked with zirconium salts under alkaline conditions wherein amine-containing polymer is coated with a zirconium salt, for example, zirconium sulfate, and the pH is raised cross-linking the polymer. Cross-linking agents conventionally employed with hydroxyl-containing polymers such as boric acid may also be employed.

The emulsions of the present invention may also be optically sensitized with cyanine and merocyanine dyes more easily than are gelatin emulsions. Cyanine dyes tend to aggregate less on the graft copolymers of the instant invention than with gelatin providing less light filtering and speed loss. Where desired, suitable antifoggants, toners, restrainers, developers, accelerators, preservatives, coating aids, plasticizers, hardeners and/or stabilizers may be included in the composition of the emulsion.

The emulsions of this invention may be coated and processed according to conventional procedures of the art. They may be coated, for example, onto various types of rigid or flexible supports, such as glass, paper, metal, and polymeric films of both the synthetic type and those derived from naturally occurring products. As examples of specific materials, which may serve as supports, mention may be made of paper, aluminum, polymethacrylic acid, methyl and ethyl esters, vinylchloride polymers, polyvinyl acetal, polyamides such as nylon, polyesters such as polymeric film derived from ethylene glycol-terephthalic acid, and cellulose derivatives such as cellulose acetate, triacetate, nitrate, propionate, butyrate, acetate propionate, and acetate butyrate. These novel emulsions of the instant invention have been found to adhere to supports in a most satisfactory manner.

The polymers employed in the practice of the instant invention may contain from 5–75 mole percent of the grafted monomer preferably 20 mole percent. The specific amount employed may be selected by the operator depending upon the grain particle size and habit desired. For example, the grain size distribution of the smulsion may be varied by changing the mole ratio and type of monomers grafted on the hydroxyl-containing polymer backbone.

Emulsions made from the polymers of the instant invention are characterized by excellent latent image stability and film speed.

By selecting appropriate monomers to be grafted on the hydroxyl-containing polymers, the instant graft copolymers may be made to be compatible with all water-soluble bodying polymers. Emulsions made from these novel polymers may therefore, be bodied with any water soluble polymers, overcoming the disadvantage encountered with gelatin which is only compatible with a very few polymers in a most limited pH range. As examples of specific materials which may serve as bodying polymers are polyvinyl alcohol, polyacrylamide, polyalkylacrylamides, polyvinyl pyrrolidone, poly($\beta$-hydroxyethyl acrylate), polyethylene imine and cellulose derivatives such as hydroxypropyl cellulose and methyl cellulose. It has been found that using only a small amount of one or more of the instant graft copolymers, large amounts of photosensitive silver halide grains may be obtained. For example, emulsions prepared using approximately 75% less of a graft polymer of 6.1 mole percent of $\beta$-(dimethylamino)-ethyl methacrylate on polyvinyl alcohol in the basic emulsion procedure described hereinafter, showed the same amount of silver halide with identical grain shape and size distribution as was obtained with 100% of the same graft copolymer. An emulsion made from one of these polymers of the instant invention may therefore be bodied with a water-soluble polymer such that the polymeric constitution of the resulting emulsion comprises a relatively large percentage of the bodying polymer.

By selecting appropriate comonomers, copolymers with selected diffusion characteristics may be prepared. For example, the following Table I illustrates that the rate of diffusion of alkali through an emulsion comprising one of the novel polymers may be varied by changing the polymer composition. Permeation was determined optically by a device which recorded the change in light transmission which occurred when alkali permeated a layer of the specified polymer and contacted an indicator dye which recorded the pH change.

TABLE I

| Polymer (at 225 mg./ft.$^2$) | NaOH permeation rate, mg. NaOH/ft.$^2$ sec. | Time to pH 10 (seconds) |
| --- | --- | --- |
| Gelatin | 360.00 | 0.09 |
| Polyvinyl alcohol | 30.0 | 0.60 |
| 4.68/1/3.12 N-isopropyl acrylamide/$\beta$-(dimethylamino)-ethyl methacrylate on polyvinyl alcohol | 180 | 0.13 |

The foregoing table shows that the graft copolymer can be prepared with a permeation rate six times that of the backbone polymer.

The instant polymers have been found to impart a black toning effect to silver obtained by physical development.

The instant graft copolymers with acidic comonomers may be pH flocculated in order to remove the soluble salts formed as a by-product of the double decomposition reaction between the water-soluble silver salt and the water-soluble halide, in addition to any unreacted excess of the initial salts. As an example, a graft copolymer of 4/1/2/1 diacetone acrylamide/$\beta$-(dimethylamino)-ethyl methacrylate/acrylic acid and polyvinyl alcohol may be precipitated by lowering the pH below 5 and then washed and resuspended by raising the pH to above 7.

The instant invention will be further illustrated by reference to the following nonlimiting examples in which the preparation of the emulsion was carried out in the following general manner.

PROCEDURE A

A solution of 4.15 g. of the dry graft copolymer in 266 ml. of distilled water was adjusted to pH 6.30 with dilute nitric acid and maintained at a temperature of 55° C. To this solution, 44.0 g. of dry potassium bromide and 0.50 g. of dry potassium iodide were added.

A solution of 55 g. of silver nitrate in 500 ml. of distilled water was prepared. From this silver nitrate solution, 100 ml. was rapidly added with continuous agitation to the polymer-halide solution and an additional 396 ml. was added over a period of 22 minutes. Thereafter, the emusion was ripened for 30 minutes at 55° C., and then rapidly cooled to below 20° C.

PROCEDURE B

In an alternative procedure for preparing the emulsion, the pH of the graft copolymer solution was adjusted to 3.0; the amount of dry potassium bromide used was 88.0 g. and the amount of dry potassium iodide used was 1.0 g. In addition, the emulsion was ripened for 60 minutes instead of for 30 minutes.

The emulsion mixture in both procedures was centrifuged and washed with water to a low conductance. The emulsion was then redispersed in distilled water. To an aliquot of this emulsion was added a known quantity of a solution of bodying or thickening polymer of polyvinyl alcohol having an average molecular weight of about 100,000 (commercially available from E. I. du Pont de Nemours & Company, Wilmington, Del., designated Type 72–60). A surfactant, such as Aerosol OT, was added and the emulsion was slot coated onto a base of cellulose triacetate sheet 5 mils thick having a coating of 30 mg./sq. ft. of hardened gelatin (Celfa, commercially available from Instar Supply Company, New York, N.Y.). This film so prepared was air dried, exposed on a sensitometer, and processed with a processing solution and an image-receiving sheet from a Type 107 film assembly (Polaroid Corporation, Cambridge, Mass.). The negative and image-receiving element were maintained in superposed position for 15 seconds, after which they were stripped apart. The photographic characteristics of the resulting positive print were measured on an automatic recording densitometer. Alternatively, the processing was effected with a processing solution and an image-receiving sheet from a Polaroid 200–400 speed Land Type 42 black and white roll film, or from a Polaroid 3000 speed Land Type 20C black and white film.

The following non-limiting examples illustrate the preparation of graft copolymers and emulsions within the scope of the present invention.

EXAMPLE I

A flask was charged with 35.64 g. β-(dimethylamino)-ethyl methacrylate, 50 ml. of a 10% solution of polyvinyl alcohol (Elvanol 70–05, du Pont Company, Wilmington, Del.), and 3.0 g. ceric ammonium nitrate in 150 ml. of water at a pH of 1.5. The solution was stirred overnight with a stream of nitrogen bubbling through. The 9/7 graft copolymer was precipitated into acetone and dried under vacuum at 45° C.

An emulsion prepared according to Procedure B employing the graft copolymer showed octahedral shaped crystals having an average particle size of 0.9 micron.

EXAMPLE II

To a solution of 22 g. of polyvinyl alcohol (0.5 mole) in 500 ml. of water stirred under nitrogen was added 23.7 g. isopropyl acrylamide (0.21 mole), 11.0 g. of β-(dimethylamino)-ethyl methacrylate (0.07 mole), 4.5 cc. concentrated nitric acid and 10 cc. of 1.01 mole ceric ammonium nitrate in 1 mole nitric acid was stirred overnight. The 3/1/7 graft copolymer of isopropyl acrylamide/β-(dimethylamino) ethyl methacrylate/polyvinyl alcohol copolymer was isolated as in Example I.

An emulsion prepared according to Procedure A employing the graft copolymer showed octahedral crystals having an average particle size of 0.7 micron.

EXAMPLE III

A 4/3 graft copolymer of β-(dimethylamino)-ethyl methacrylate nitrate on polyvinyl alcohol was prepared and isolated according to the procedure of Example I.

An emulsion prepared according to Procedure B employing the graft copolymer showed octahedral crystals having an average particle size of 1 micron.

EXAMPLE IV

A 9/1/6 graft copolymer of N-isopropyl acrylamide and β-(dimethylamino)-ethyl acrylate on polyvinyl alcohol was prepared and isolated according to the procedure of Example I.

An emulsion prepared according to Procedure A employing the graft copolymer showed amorphous-shaped crystals with an average size of less than 0.3 micron.

EXAMPLE V

To a solution of 11 g. of polyvinyl alcohol in 500 cc. of water was added 35 g. (0.5 mole) of acrylamide and 10 g. (0.07 mole) of β-(dimethylamino) ethyl methacrylate. The pH was adjusted to 1.5, the temperature to 50° C. and 1.1 g. of ceric ammonium nitrate in 10 cc. of water was added. The solution was stirred for two hours under nitrogen. The 7/1/3.5 graft copolymer of acrylamide and β-(dimethylamino) ethyl methacrylate on polyvinyl alcohol was isolated according to the procedure of Example I.

An emulsion prepared according to Procedure A employing the graft copolymer showed octahedral crystals having an average particle size of 1 micron.

EXAMPLE VI

A 4/1/3.5 graft copolymer of acrylamide and β-(dimethylamino) ethyl methacrylate on polyvinyl alcohol was prepared and isolated according to the procedure of Example I.

An emulsion prepared according to Procedure A employing the novel graft copolymer showed octahedral crystals having an average particle size of 1.2 micron.

EXAMPLE VII

To a solution of 10 g. of gelatin in 500 of water was added 20 g. of β-(dimethylamino) ethyl methacrylate. The pH was adjusted to 1.5 and 0.55 g. of ceric ammonium nitrate in 10 cc. of water was added. Stirring under nitrogen was continued overnight. The 2/1 graft copolymer of β-(dimethylamino) ethyl methacrylate on gelatin was diluted and employed in forming silver halide crystals.

In certain photographic applications, it may be desirable to replace part, but not all, of the gelatin in the photosensitive emulsion. In view of the characteristics of these polymers described above, and further, in view of their compatability with gelatin in substantially all proportions, it will be obvious that these polymers are ideally suited for such work.

The term "photosensitive" and other terms of similar import are herein employed in the generic sense to describe materials possessing physical and chemical properties which enable them to form usable images when photoexposed by radiation.

Since certain changes may be made in the above products and processes without departing from the scope of the invention herein involved, it is intended that all matter contained in the above description shall be interpreted as illustrative only and not in a limiting sense.

What is claimed is:

1. A photosensitive silver halide emulsion wherein the emulsion binder comprises a graft copolymer of an amine-acrylate monomer of the formula:

$$\begin{array}{c} R_1 \ R_2 \ O \qquad\quad R_4 \\ |\ \ |\ \ \| \qquad\ \ / \\ HC=C-C-O-R_3-N \\ \qquad\qquad\qquad\quad \backslash \\ \qquad\qquad\qquad\qquad R_5 \end{array}$$

wherein $R_1$ is selected from the group consisting of hydrogen, lower alkyl, and halogen; $R_2$ is selected from the group consisting of hydrogen, lower alkyl, halogen and cyano; $R_3$ is selected from the group consisting of lower alkylene and lower cycloalkylene; $R_4$ and $R_5$ are selected from the group consisting of hydrogen, lower alkyl and lower cycloalkyl; and $R_3$ and/or $R_4$ and/or $R_5$ may comprise a ring structure; onto a polymer containing a plurality of hydroxyl groups.

2. The product as defined in claim 1 wherein substantially all of said emulsion binder comprises said graft copolymer.

3. The product as defined in claim 1 wherein said silver halide emulsion is a silver iodobromide emulsion.

4. The product as defined in claim 1 wherein said emulsion includes at least one chemical sensitizing agent.

5. The product as defined in claim 1 wherein said emulsion includes at least one optical sensitizing agent.

6. The product as defined in claim 1 wherein said monomer is β-(dimethylamino) ethyl methacrylate.

7. The product as defined in claim 1 wherein said graft copolymer includes a comonomer grafted thereon.

8. The product as defined in claim 7 wherein said comonomer is acrylamide.

9. The product as defined in claim 7 wherein said comonomer is N-isopropyl acrylamide.

10. The product as defined in claim 1 wherein said hydroxyl-containing polymer is polyvinyl alcohol.

11. The product as defined in claim 1 wherein said hydroxyl-containing polymer is gelatin.

12. A method of preparing a photosensitive silver halide emulsion which comprises reacting a water-soluble silver salt with a water-soluble halide salt in an aqueous solution containing a graft copolymer of an amine-acrylate monomer of the formula:

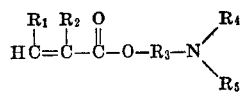

wherein $R_1$ is selected from the group consisting of hydrogen, lower alkyl and halogen; $R_2$ is selected from the group consisting of hydrogen, lower alkyl, halogen and cyano; $R_3$ is selected from the group consisting of lower alkylene and lower cycloalkylene; $R_4$ and $R_5$ are selected from the group consisting of hydrogen, lower alkyl and lower cycloalkyl; and $R_3$ and/or $R_4$ and/or $R_5$ may comprise a ring structure, onto a polymer containing a plurality of hydroxyl groups.

13. The method as defined in claim 12 wherein said monomer is $\beta$-(dimethylamino) ethyl methacrylate.

14. The method as defined in claim 12 wherein said graft copolymer includes a comonomer grafted thereon.

15. The method as defined in claim 14 wherein said comonomer is acrylamide.

16. The method as defined in claim 14 wherein said comonomer is N-isopropyl acrylamide.

17. The method as defined in claim 14 wherein said hydroxyl-containing polymer is polyvinyl alcohol.

18. The method as defined in claim 14 wherein said hydroxyl-containing polymer is gelatin.

References Cited

UNITED STATES PATENTS

| | | | |
|---|---|---|---|
| 3,084,132 | 4/1963 | Shashoua | 96—114 |
| 3,518,088 | 6/1970 | Dunn et al. | 96—114 |
| 3,518,086 | 6/1970 | Millard | 96—114 |
| 3,516,830 | 6/1970 | Whiteley | 96—114 |
| 3,512,985 | 5/1970 | Harvey | 96—114 |
| 3,488,708 | 1/1970 | Smith | 96—114 |
| 3,186,973 | 6/1965 | Maeder | 96—114 |
| 2,882,262 | 4/1959 | Smith et al. | 96—114 |
| 2,611,763 | 9/1952 | Jones | 96—114 |
| 2,811,494 | 10/1957 | Smith et al. | 96—114 |
| 3,411,911 | 11/1968 | Dykstra | 96—114 |

FOREIGN PATENTS

| | | | |
|---|---|---|---|
| 889,760 | 2/1962 | Great Britain | 96—114 |
| 634,174 | 4/1963 | Belgium | 96—114 |

RONALD H. SMITH, Primary Examiner